(12) United States Patent
Calahan et al.

(10) Patent No.: US 12,307,243 B2
(45) Date of Patent: May 20, 2025

(54) CODE MANAGEMENT CROSS-SUPPORT AND SYNCHRONIZATION

(71) Applicant: Salesforce, Inc., San Francisco, CA (US)

(72) Inventors: Patrick Calahan, San Francisco, CA (US); Vishrut Dixit, Chicago, IL (US); Jonathan Thomas Hays, Grass Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 486 days.

(21) Appl. No.: 17/580,499

(22) Filed: Jan. 20, 2022

(65) Prior Publication Data

US 2023/0229435 A1  Jul. 20, 2023

(51) Int. Cl.
  *G06F 8/71*  (2018.01)

(52) U.S. Cl.
  CPC ...................... *G06F 8/71* (2013.01)

(58) Field of Classification Search
  CPC ........................................................ G06F 8/71
  See application file for complete search history.

(56) References Cited

U.S. PATENT DOCUMENTS

| | | | |
|---|---|---|---|
| 5,675,802 A * | 10/1997 | Allen | G06F 16/27 |
| | | | 707/999.203 |
| 6,757,893 B1 * | 6/2004 | Haikin | G06F 8/71 |
| | | | 717/170 |
| 7,680,838 B1 * | 3/2010 | Shaw | G06F 16/178 |
| | | | 707/610 |
| 8,819,081 B2 | 8/2014 | Calahan et al. | |
| 8,826,222 B2 * | 9/2014 | Bak | G06F 8/71 |
| | | | 717/136 |
| 8,914,344 B1 * | 12/2014 | Anderson | G06F 8/71 |
| | | | 707/704 |
| 9,003,399 B2 * | 4/2015 | Bak | G06F 8/60 |
| | | | 717/177 |
| 9,069,792 B1 * | 6/2015 | Craighead | G06F 16/1873 |
| 9,081,869 B2 | 7/2015 | Calahan | |
| 9,111,006 B2 | 8/2015 | Calahan | |
| 9,185,078 B2 | 11/2015 | Wong et al. | |
| 9,557,968 B1 * | 1/2017 | Smith | G06F 8/75 |
| 9,575,764 B1 * | 2/2017 | Turner | G06F 3/14 |
| 9,740,476 B2 * | 8/2017 | Eberlein | G06F 8/71 |
| 9,965,634 B2 | 5/2018 | Calahan | |
| 10,083,030 B1 * | 9/2018 | Fant, IV | G06F 8/61 |
| 10,089,488 B2 | 10/2018 | Wong et al. | |
| 10,366,517 B2 | 7/2019 | Calahan et al. | |

(Continued)

OTHER PUBLICATIONS

Chacon, et al., "Pro Git," Rebasing, apress, 2nd Edition, Dec. 21, 2021, pp. 95-104.

(Continued)

*Primary Examiner* — Douglas M Slachta
(74) *Attorney, Agent, or Firm* — NICHOLSON DE VOS WEBSTER & ELLIOTT LLP (57) ABSTRACT

A method for managing code development includes receiving, from a workspace, a request for a primary set of code in a first repository, providing, in response to the request, the primary set of code to the workspace with support for code management for the primary set of code from a first code management system, and providing, in response to the request, a secondary set of code to the workspace with support for code management for the supporting set of code from a second code management system.

12 Claims, 6 Drawing Sheets

(56) References Cited

U.S. PATENT DOCUMENTS

| | | | |
|---|---|---|---|
| 10,372,424 B2* | 8/2019 | Evans | G06F 8/33 |
| 10,587,401 B2 | 3/2020 | Calahan | |
| 11,061,664 B2* | 7/2021 | Tanaka | G06F 8/34 |
| 11,416,382 B2* | 8/2022 | Han | G06F 11/3698 |
| 11,775,287 B2* | 10/2023 | Subramanian | G06F 8/71 |
| | | | 717/170 |
| 2011/0125798 A1* | 5/2011 | Misch | G06F 8/71 |
| | | | 717/110 |
| 2011/0276834 A1 | 11/2011 | Calahan et al. | |
| 2016/0092250 A1* | 3/2016 | Wagner | G06F 9/44536 |
| | | | 718/1 |
| 2016/0092526 A1* | 3/2016 | Kothari | G06F 16/182 |
| | | | 707/602 |
| 2018/0157478 A1* | 6/2018 | Wong | G06F 8/65 |
| 2018/0210713 A1* | 7/2018 | Busjaeger | G06F 16/2471 |
| 2020/0169393 A1 | 5/2020 | Calahan | |
| 2022/0100498 A1* | 3/2022 | Guim Bernat | G06F 8/71 |
| 2022/0164672 A1* | 5/2022 | Bird | G06N 3/084 |
| 2023/0140552 A1* | 5/2023 | Turgut | G06F 11/3688 |
| | | | 717/124 |

OTHER PUBLICATIONS

Coursen, L., "Working with large files and repositories," Support Protips, GitHub Community, Jul. 2018, downloaded from https://github.community/t/working-with-large-files-and-repositories/10203 on Jan. 12, 2022, pp. 1-2.

Harry, B., "The largest Git repo on the planet," Brian Harry's Blog, DevBlogs, Microsoft, May 24, 2017, downloaded from https://devblogs.microsoft.com/bharry/the-largest-git-repo-on-the-planet/ on Jan. 12, 2022, pp. 1-7.

Howell, M., "Homebrew: The Missing Package Manager for macOS (or Linux)," downloaded from https://brew.sh/ on Jan. 12, 2022, pp. 1-3.

Stolee, D., "Introducing Scalar: Git at scale for everyone," Azure DevOps Blog, Microsoft, Feb. 12, 2020, downloaded from https://devblogs.microsoft.com/devops/introducing-scalar/ on Jan. 12, 2022, pp. 1-11.

Wikipedia, "Git," Adoption, last edited Dec. 28, 2021, downloaded from https://en.m.wikipedia.org/wiki/Git#Adoption on Jan. 12, 2022, pp. 15-16.

* cited by examiner

CODE MANAGEMENT CROSS-SUPPORT AND SYNCHRONIZATION

TECHNICAL FIELD

One or more implementations relate to the field of code management; and more specifically, to a process and system of version control for source code development stored in a code repository.

BACKGROUND ART

Source code development on large projects can involve a large number of programmers that are working on various aspect of the source code in parallel. To coherently manage the source code, version control software has been developed that enables users to update or add code in a set of source code files without adversely affecting the work of other users that are also updating and adding to the source code files such that errors and inconsistencies are not introduced into the source code files. In this context version control software is any kind of software that tracks and manages changes to a repository of source code that is composed of source code files. Version control software can also be utilized to manage documentation for the software, configuration files, and similar resources related to software development. Version control software has also been developed for other file or document repositories with similar use cases.

The version control software can manage multiple versions of a software project that may be designed to be deployed on different platforms, or in different configurations. Certain features of the software defined by the source code may be present in certain versions, but not others. Maintaining the various versions can be important for maintaining related software products and to determine which versions may include certain errors (i.e., by comparison of the operation of the different versions).

In addition, users can often be located in geographically varied locations even when they work on the same team. The version control can help coordinate development of a project and keep logs on the changes introduced by each team member over time, which can help manage the software development project as well as track contributions, project milestones, and similar information. Version control software can be structured as a centralized system, with a single authoritative data store, referred to as the repository. The version control can support user check-outs and check-ins of portions of the source code with reference to the repository that stores the authoritative versions. Version control software can also be implemented as a distributed system without a single repository being authoritative. In distributed version control software, the source code or similar data can be checked out and checked into a plurality of related repositories. The distributed version control software can support a check out process that pulls the requested source code from a set of repositories managed by the distributed version control software. Similarly, the distributed version control software can enable checking in the modified source code to any combination of the available repositories managed by the distributed version control software as a merge or patch.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a process and system that enables the use of multiple code management systems in a hybrid workspace. A cross support system enables a user of a workspace development environment to work a set of source code files that are managed by at least two separate code management systems. The cross support system enables a hybrid workspace development environment where the user can work on code from two or more code management systems in a manner that is seamless for the user such that the user is able to work with the code as though it were entirely managed by a primary source code management system while a secondary source code management system can provide supporting source code.

In an example embodiment, users can collaboratively code, test, and review their changes to the source code using a primary source code management system (e.g., Git, a free and open-source software project). The cross support system can then submit the changes to a secondary source code manager (e.g., Perforce version control software by Perforce Software, Inc.). In the example embodiments, the secondary source code manager can represent a larger and older source code repository whereas the primary source code manager is a newer source code manager that the users are transitioning toward. In this example embodiment, the secondary source code manager and the secondary source code repository can be designated as the authoritative copy of the source code (i.e., the 'source of truth'). The user can work on their code by interfacing with the primary code management system. The cross support system can submit code updates the secondary code management system (e.g., submission of the updates to Perforce using precheckin function of Perforce). This process can be totally transparent to user and the existing infrastructure of the secondary code management system. Thus, the embodiments provide a solution that can be utilized safely, incrementally, and inexpensively as needed by the developers.

The embodiments also introduce hybrid development workspaces, referred to herein as hybrid workspaces. The embodiments enable users to work with a partial build in the hybrid workspace, which is a subset of the build of the software application. Further, the embodiments enable the user to work on a subset of the source code repositories. The source code files that a user is most concerned with can be handled by the primary source code manager. Other source code files can be sideloaded into the hybrid workspace from the secondary source code manager. The cross support system of the embodiments provides a cost-saving option for source code management, which can be employed in cases where a huge source code repository cannot be cost effectively or timely migrated to a new source code management system (e.g., a transition from Perforce to Git).

Figure 1A:
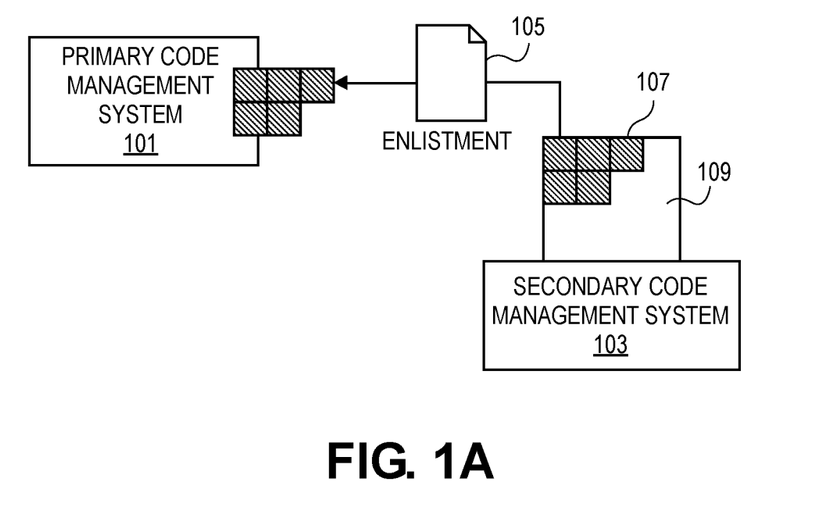
FIG. 1A is a diagram of one embodiment of a migration of a set of source code files from a secondary code management system to a primary code management system.

FIG. 1A is a diagram of one embodiment of a migration of a set of source code files from a secondary code management system to a primary code management system. In the example of FIG. 1A, a large set of source code files 109 is managed by a secondary code management system 103. A 'set,' as used herein can refer to any positive whole number of items including one item. The large set of source code files 109 can include any number, variety, and format of source code files or similar files that are worked on by a group of users in a collaborative fashion. The example of source code management is provided herein, however, one skilled in the art would appreciate that the principles and structures of the embodiments can be applied to any type of shared file management system with version tracking that enables a group of users to collaborate on the set of files.

The secondary code management system 103 can be any version control software (e.g., Perforce version control software). The secondary source code management system 103 can manage the set of source code files in a centralized or decentralized manner. The secondary source code management system 103 can organize the source code files according to the associated project or software build. Each project or similar grouping of source code files can be organized as a repository. A set of users for the repository can be defined and permissions set for these users that govern how the source code files in the repository can be accessed, modified, or deleted. Similarly, an administrator for each repository can define a set of policies that govern the manner in which the set of source code files in that repository can be modified, added, or deleted.

In the embodiments, an administrator or similar user of a repository can define an enlistment 105 that identifies each of the source code files that are to be replicated or migrated to the primary code management system 101. The list of source code files can include any number of source code files. The enlistment 105 can also identify the repository of the primary code management system 101 into which the source code files are to be reproduced. The enlistment 105 can have any format or organization. The cross support system receives the enlistment from a user development workspace, a repository administrator, or similar entity. The cross support system can interface with both the secondary code management system 103 and the primary code management system 101. The cross support system requests a copy of the listed source code files from the secondary code management system 103 and stores them in an existing or new repository in the primary code management system 101. The enlistment 105 is a configuration file that can be parsed by the cross support system to identify the source code file locations in the primary and secondary code management systems 101, 103.

The enlistment 105 or similar files can further define policies for the management of the reproduced source code files. In one embodiment, the enlistment 105 or similar configuration file can define the frequency for synchronizing the files in the primary code management system 101 and the secondary code management system 103. The cross support system can include a function that schedules a regular (e.g., hourly) synchronization of the source code files of the primary code management system 101 and the secondary code management system 103. This synchronization can be an update from the secondary code management system 103 to the primary code management system 101, where changes to the reproduced source code files are automatically transferred to the primary code management system 101. This regularly scheduled synchronization can replace or update the source code files at the primary code management system 101 when the files are not actively in use. The cross support system can notify users of a new version or perform a merge of changes when the source code files are in use at the primary code management system 101. The cross support system makes use of the functions or application programming interface (API) of the primary code management system 101 to implement the synchronization (e.g., using Git operations such as add, merge, pull, clone, and similar operations). Similarly, the status of the source code files in the secondary code management system 107 can be monitored and in response to changes, the changes can be retrieved to be replicated at the primary code management system 101. As with the primary code management system 101, the monitoring of the status and the retrieval of updated source code files is implemented by the cross support system using operations or API of the secondary source code management system.

Figure 1B:
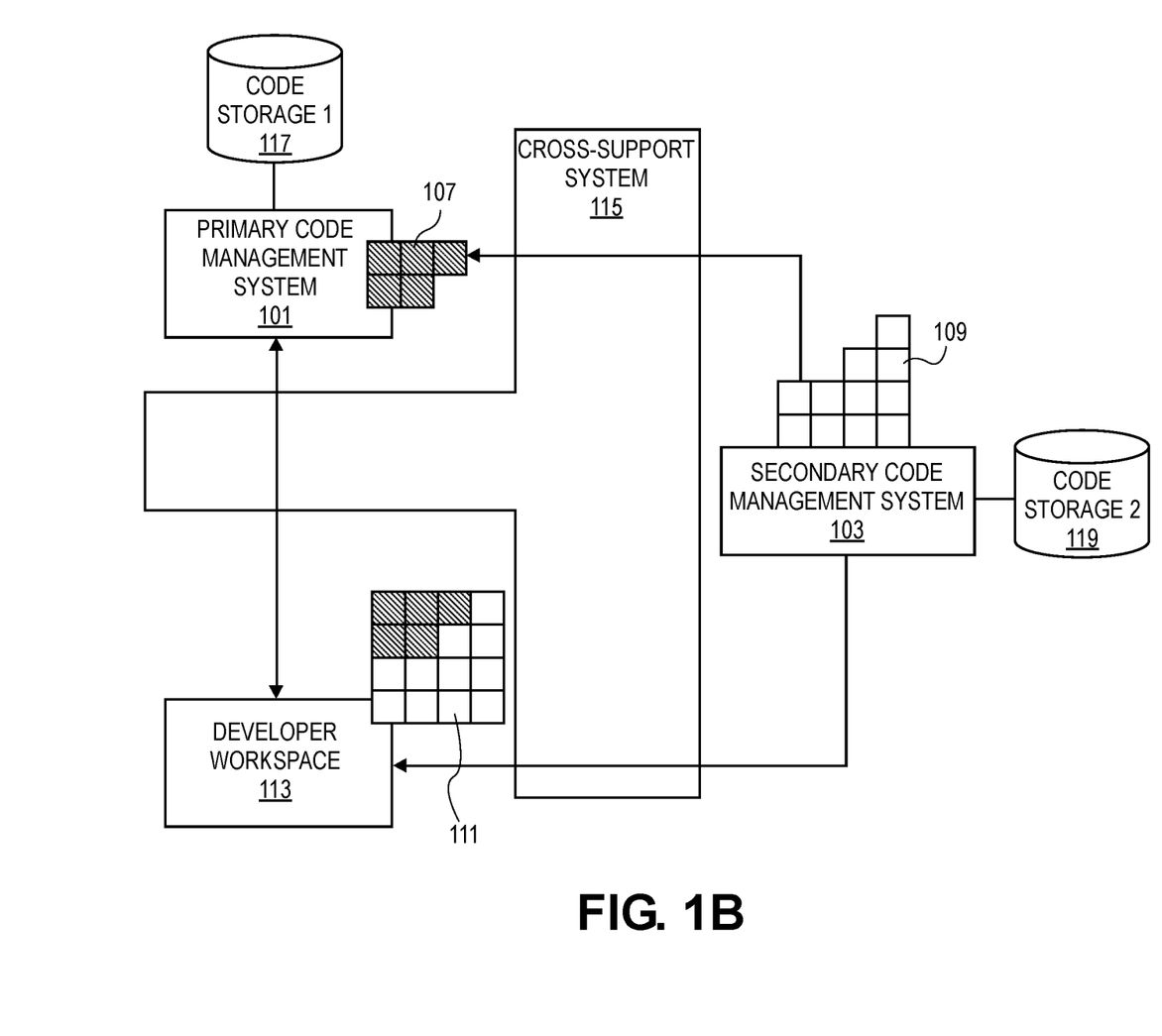
FIG. 1B is a diagram of one embodiment of a system for cross support of multiple code management systems.

FIG. 1B is a diagram of one embodiment of a cross support system supporting a hybrid developer workspace. The cross support system 115 can be a discrete piece of software, an independent set of functions, or similar organizations of functions or combinations thereof. The cross support system 115 can largely operate transparently to the user of the developer workspace 113. The developer workspace 113 can be any integrated development environment (IDE), such as Eclipse, which enables a user to modify, create, or delete source code in the source code files as well as test, debug, compile, or execute the source code files depending on the developer workspace 113

A user can trigger the operations of the cross support system 115 when initiating work on a set of source code files. The developer workspace 113 can request the source code files to be worked on from the primary code management system 101. The source code files can be requested by a call to an operation of the primary code management system 101 to replicate or copy the source code files (e.g., using a clone operation in Git). Each of the requested files is retrieved from the corresponding repository stored in a code storage 117 and provided to the developer workspace 113. The code storage 117 can be any type of centralized or distributed storage system including a centralized or distributed file storage system, a database system, or similar storage system.

Once the source code files are retrieved from the primary source code management system 101 and returned to the developer workspace 113, the user can interact with these source code files and the primary code management system 101 to collaborate with other users to develop the software associated with these source code files. All of the features of the primary code management system 101 can be utilized (e.g., clone, branch, push, and similar operations of a Git repository).

In parallel with the retrieval of the requested source code files from the primary code management system 101, the cross support system can identify and load any source code files from the secondary code management 109, which stores these source code files in a code storage 119. The code storage 119 can be any type of centralized or distributed storage system including a centralized or distributed file storage system, a database system, or similar storage system. The cross support system can identify the supporting source code files by monitoring source code file requests to the primary code management system 101. The source code requests can be intercepted, snooped, or similarly monitored and used to identify the requested source code and a project identifier, entitlement list identifier, or similar identifiers to correlate the requested code from the primary code management system 101 with related or dependent source code files in the secondary code management system 103. These supporting source code files 111 can then be requested from the secondary code management system 103 by the cross support system 115 using the operations or API of the secondary code management system (e.g., checkout file operations). The supporting source files 109 can then be combined with the enlisted source files 107 to reconstitute the set of source files 111 needed for a given build, testing, or development of the project.

The developer workspace 113 can operate on the source files received from the primary code management system 101 and the secondary code management system 103 in the same manner as cases where all of the source files are received from a single code management system. The exception to the normal operation is the checkin or update operation that stores changes back into the respective cod management systems and repositories. The operation of the creation or set up of the developer workspace is further described herein with relation to FIG. 2. Similarly, the operation of checking in the updated source files is described herein further in relation to FIG. 3.

Figure 2:
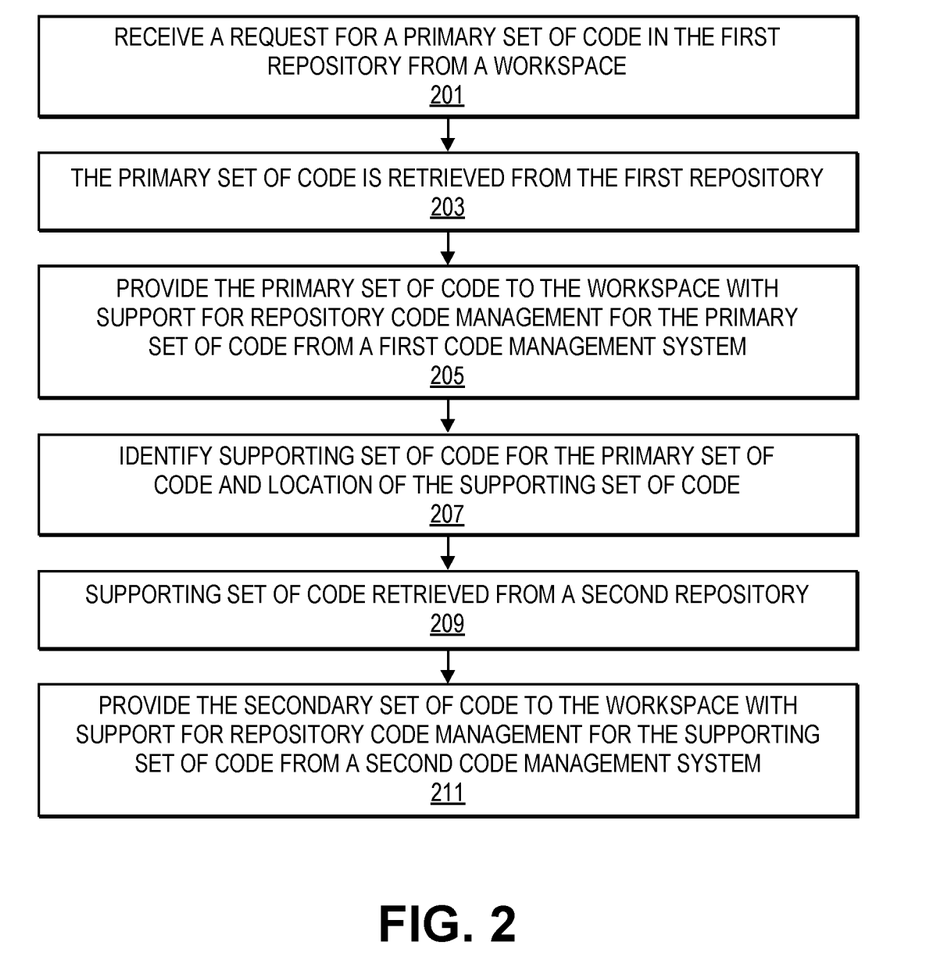
FIG. 2 is a flowchart of one embodiment of a process for retrieving source code for a developer workplace.

FIG. 2 is a flowchart of one embodiment of a process for retrieving source code for a developer workplace. The process of setting up a developer workspace to work on a set of source code files can be triggered by a user making a request for a primary set of code in a first repository managed by a first code management system (Block 201). The request for the primary set of code can be an invocation of a clone operation or similar operation of the primary code management system. The operation can be processed by the cross support system or can directly be provided to the primary code management system. The primary code management system receives the request and marshals the requested set of source code files to be returned to the requesting developer workspace (Block 203). The requested source code files can be identified based on identifier of the repository they are grouped into, specific identification of the individual files, or similar mechanisms. The primary code management system then returns the requested set of source code files to the requesting developer workspace (Block 205). The primary code management system can offer a range of operations that can be requested by the developer workspace including add, checkin, checkout, clone, commit, merge, and similar operations that enable the user of the developer workspace to coherently work with the source code files in collaboration with other users of developer workspaces and similar applications.

In addition, the cross support system can detect the access of the primary set of code and initiate a process to retrieve a supporting set of code. Detecting the access of the primary set of code can be implemented using any of a variety of mechanisms including intercepting, passing, or similarly processing the request for the primary set of code. In other embodiments, the primary set of code is organized with a relationship to the secondary set of code either identified in the developer workspace as a configuration file (e.g., for a build), in the cross support system, or similar organization. In some embodiments, the secondary set of code is fixed or shared across all primary sets of code in the repositories of the primary code system such that the cross support system retrieves all of the source code files in the fixed set of source code files that are not a part of the mutable primary set of code. The secondary set of source code files can be maintained as a read only repository in the secondary code management system that is periodically updated and synchronized with an active repository in the secondary code management system. In some embodiments, the set of source code files to be retrieved is determined based on a subtraction of the primary source code files for a build maintained in the developer's workspace, based on a subtraction of the source code files listed in the enlistment associated with the developer's workspace, or based on similar mechanisms. In other embodiments, source code files of the secondary set of code are identified individually by path names, or similar identifiers.

The cross support system can then retrieve the identified secondary set of code from the second repository of the secondary conde management system (Block 209). This secondary set of code can then be loaded or similarly provided to the developer workspace of the user (Block 211). The secondary set of code and primary set of code can be utilized for builds, testing, and other aspects of development in the same manner as code loaded from a single code management system and a single repository making the operations of the cross support system transparent to the user of the developer's workspace.

Figure 3:
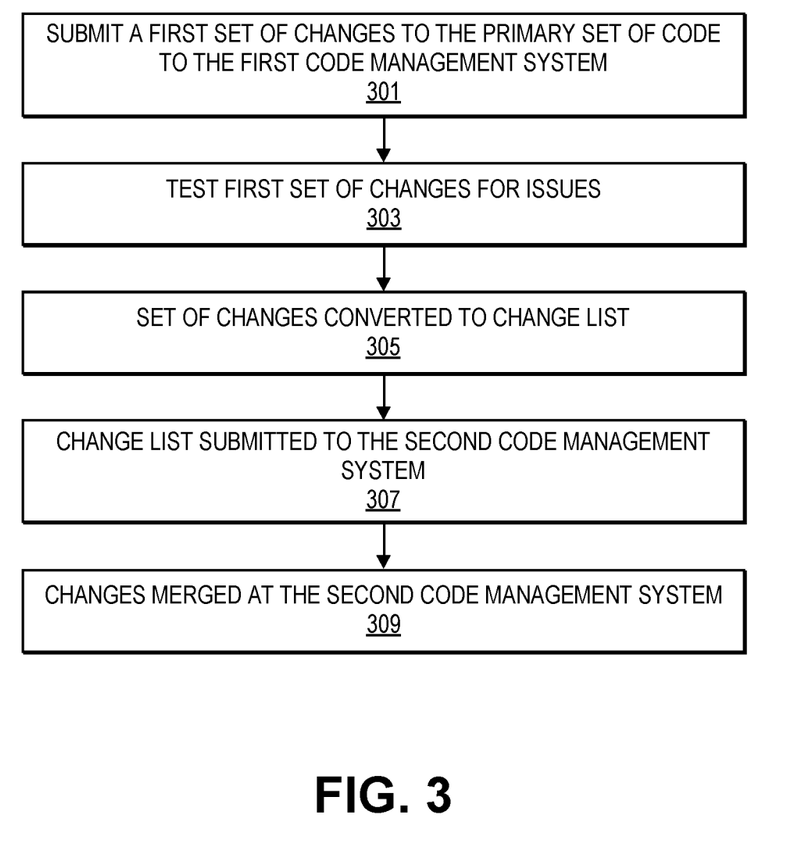
FIG. 3 is a flowchart of one embodiment of a process for updating source code across multiple code management systems by a cross support system.

FIG. 3 is a flowchart of one embodiment of a process for updating source code across multiple code management systems by a cross support system. Once a set of primary and secondary source code files have been provided to a developer's workspace, the user can trigger an update, checkin, submission, or similar operation to commit the changes, additions, and/or deletions to the source code files to their respective repositories (Block 301). The update can include a first set of changes to the primary set of code that are submitted to the first code management system. The set of changes can be processed according to the standard procedures of the primary code management system. The primary code management system can test or process the changes to primary set of code before committing the changes to the first code repository of the primary code management system (Block 303).

The cross support system can detect changes to the primary set of code and trigger a generation of a change list for any changes to the primary set of code that are to be updated into the secondary code management system and repository (Block 305). The secondary code management system can utilize a different change format than the primary code management system. In one embodiment, the changes are converted into a change list or similar format compatible with the secondary code management system. In further embodiments, the cross support system can also detect or receive changes to the secondary set of code, which can be formatted for the secondary code management system for submission. Once the change list is submitted to the secondary code management system (Block 307), the cross support system can merge or similarly commit these changes to the second repository of the second code management system (Block 309).

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
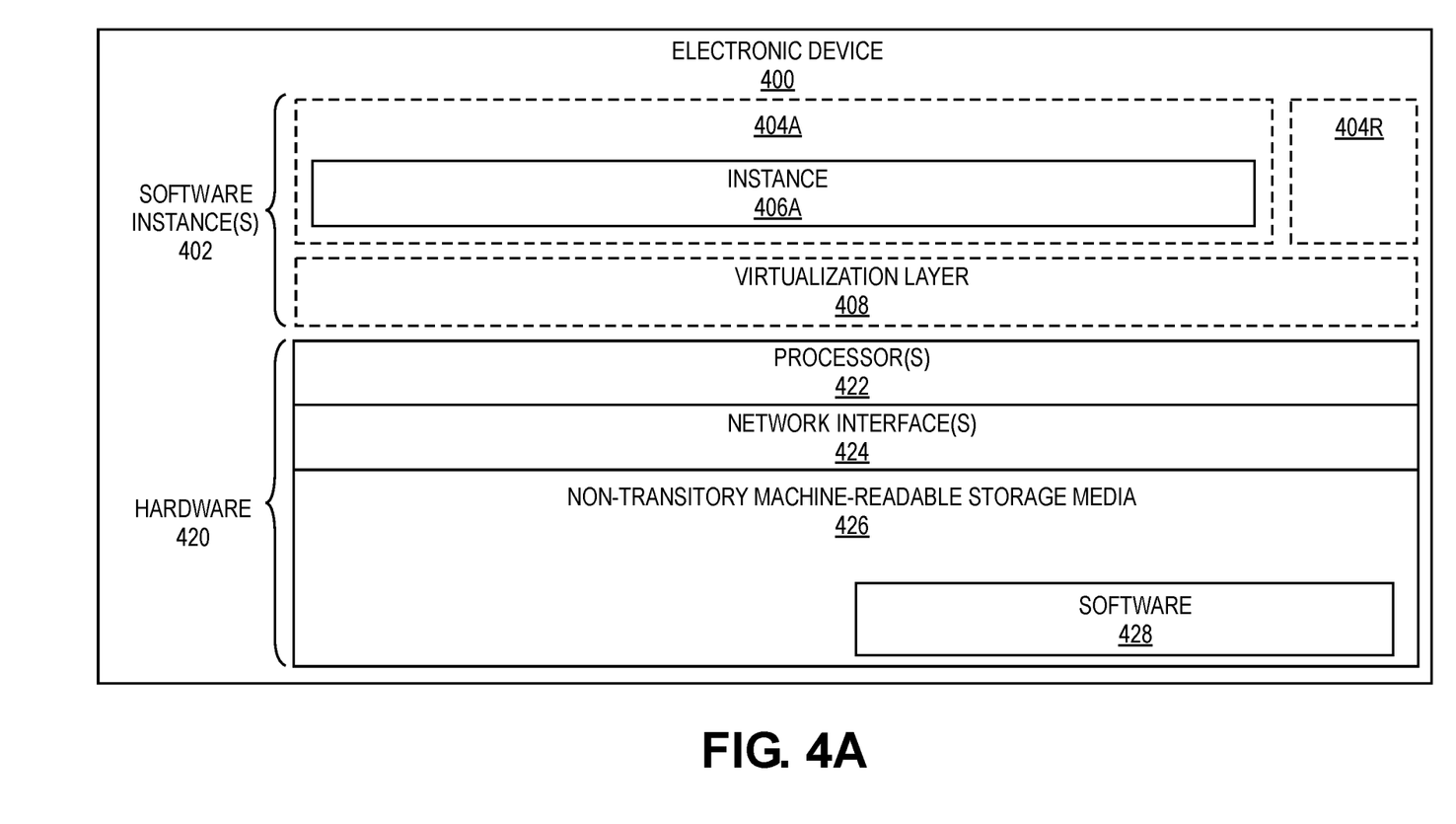
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described clients and the cross support service may be implemented in one or more electronic devices 400. In one implementation: 1) each of the clients is implemented in a separate one of the electronic devices 400 (e.g., in end user devices where the software 428 represents the software to implement clients to interface directly and/or indirectly with the cross support service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the cross support service is implemented in a separate set of one or more of the electronic devices 400 (e.g., a set of one or more server devices where the software 428 represents the software to implement the cross support service); and 3) in operation, the electronic devices implementing the clients and the cross support service would be communicatively coupled (e.g., by a network) and would establish between them (or through one or more other layers and/or or other services) connections for retrieving source code from different code management systems by a cross support service and submitting source code changes by the cross support service to the respective code management systems and returning confirmation to the clients. Other configurations of electronic devices may be used in other implementations (e.g., an implementation in which the client and the cross support service are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
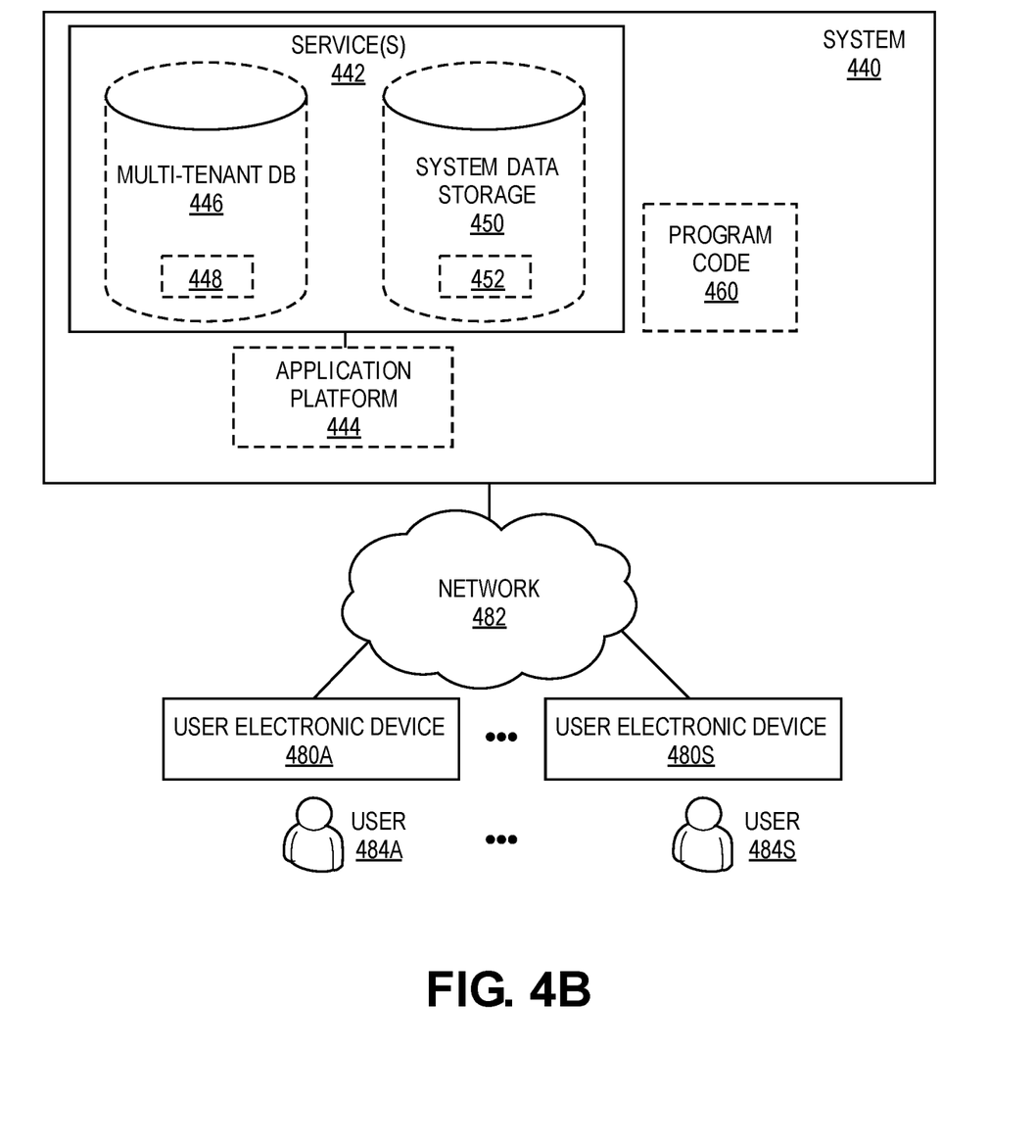
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the cross support service. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the cross support service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for managing code development, the method comprising:
   receiving, from a workspace, a request for a primary set of code in a first repository;
   providing, in response to the request, the primary set of code to the workspace with support for code management for the primary set of code from a first code management system, wherein the primary set of code has been migrated from a second code management system to the first code management system based on an enlistment that identifies source code files to be migrated to the first code management system;
   providing, in response to the request and based on access detection of the primary set of code, a secondary set of code to the workspace with support for code management for the secondary set of code from the second code management system;
   submitting a first set of changes to the primary set of code to the first code management system;
   testing the first set of changes for issues; and
   converting the first set of changes to a change list compatible with the second code management system.

2. The method of claim 1, further comprising:
   retrieving the primary set of code from the first repository; and
   identifying the secondary set of code and a location of the secondary set of code, where the secondary set of code supports execution of the primary set of code.

3. The method of claim 1, further comprising:
   submitting the change list to the second code management system.

4. The method of claim 3, further comprising:
   merging changes of the primary set of code from the first code management system with a copy of the primary set of code at the second code management system.

5. A non-transitory machine-readable storage medium that provides instructions that, if executed by a set of one or more processors, are configurable to cause said set of one or more processors to perform operations comprising:
   receiving, from a workspace, a request for a primary set of code in a first repository;
   providing, in response to the request, the primary set of code to the workspace with support for code management for the primary set of code from a first code management system, wherein the primary set of code has been migrated from a second code management system to the first code management system based on an enlistment that identifies source code files to be migrated to the first code management system;
   providing, in response to the request, a secondary set of code to the workspace with support for code management for the secondary set of code from the second code management system;
   submitting a first set of changes to the primary set of code to the first code management system;
   testing the first set of changes for issues; and
   converting the first set of changes to a change list compatible with the second code management system.

6. The non-transitory machine-readable storage medium of claim 5, providing further instructions to cause the set of one or more processors to perform further operations comprising:
   retrieving the primary set of code from the first repository; and
   identifying the secondary set of code and a location of the secondary set of code, where the secondary set of code supports execution of the primary set of code.

7. The non-transitory machine-readable storage medium of claim 5, providing further instructions to cause the set of one or more processors to perform further operations comprising:
   submitting the change list to the second code management system.

8. The non-transitory machine-readable storage medium of claim 7, providing further instructions to cause the set of one or more processors to perform further operations comprising:
   merging changes of the primary set of code from the first code management system with a copy of the primary set of code at the second code management system.

9. An apparatus comprising:
a non-transitory machine-readable storage medium that stores software; and
a set of one or more processors, coupled to the non-transitory machine-readable storage medium, to execute the software that implements a code management service and that is configurable to:
 receive, from a workspace, a request for a primary set of code in a first repository,
 provide, in response to the request, the primary set of code to the workspace with support for code management for the primary set of code from a first code management system, wherein the primary set of code has been migrated from a second code management system to the first code management system based on an enlistment that identifies source code files to be migrated to the first code management system; and
 provide, in response to the request and based on access detection of the primary set of code, a secondary set of code to the workspace with support for code management for the secondary set of code from the second code management system;
 submitting a first set of changes to the primary set of code to the first code management system;
 testing the first set of changes for issues; and
  converting the first set of changes to a change list compatible with the second code management system.

10. The apparatus of claim 9, wherein the set of one or more processors is further configurable to:
 retrieve the primary set of code from the first repository; and
 identify the secondary set of code and a location of the secondary set of code, where the secondary set of code supports execution of the primary set of code.

11. The apparatus of claim 9, wherein the set of one or more processors is further configurable to:
 submit the change list to the second code management system.

12. The apparatus of claim 11, wherein the set of one or more processors is further configurable to:
 merge changes of the primary set of code from the first code management system with a copy of the primary set of code at the second code management system.

* * * * *